United States Patent [19]

Mansfield et al.

[11] Patent Number: 5,187,783
[45] Date of Patent: Feb. 16, 1993

[54] CONTROLLER FOR DIRECT MEMORY ACCESS

[75] Inventors: Richard M. Mansfield, Bloomington; William F. Dohse, Plymouth, both of Minn.

[73] Assignee: Micral, Inc., New Brighton, Minn.

[21] Appl. No.: 324,211

[22] Filed: Mar. 15, 1989

[51] Int. Cl.$^5$ .............................. G06F 13/28
[52] U.S. Cl. .................... 395/425; 364/DIG. 1; 364/244; 364/212.3; 364/260; 364/260.4
[58] Field of Search ... 364/200 MS File, 900 MS File; 395/400, 425

[56] References Cited

U.S. PATENT DOCUMENTS

| | | | |
|---|---|---|---|
| 4,408,275 | 10/1983 | Kubo et al. | 364/200 |
| 4,445,172 | 4/1984 | Peters et al. | 364/200 |
| 4,467,447 | 8/1984 | Takahashi et al. | 364/900 |
| 4,494,186 | 1/1985 | Goss et al. | 364/200 |
| 4,514,808 | 4/1985 | Murayama et al. | 364/200 |
| 4,631,671 | 12/1986 | Kawashita et al. | 364/200 |
| 4,633,434 | 12/1986 | Scheuneman | 364/900 |
| 4,722,050 | 1/1988 | Lee et al. | 364/200 |
| 4,845,664 | 7/1989 | Aichelmann, Jr. et al. | 364/900 |
| 5,014,187 | 5/1991 | Debize et al. | 364/200 |

Primary Examiner—Joseph L. Dixon
Assistant Examiner—Rebecca L. Rudolph
Attorney, Agent, or Firm—Davis & Schroeder

[57] ABSTRACT

A direct memory access controller for computer systems in which the data may be manipulated and acted upon during a transfer to and from locations in memory, or from locations in memory to and from input/output devices. For computer systems having data word widths of two or more bytes of data fewer bus cycles are required for data transfers to and from odd address locations in memory.

5 Claims, 13 Drawing Sheets

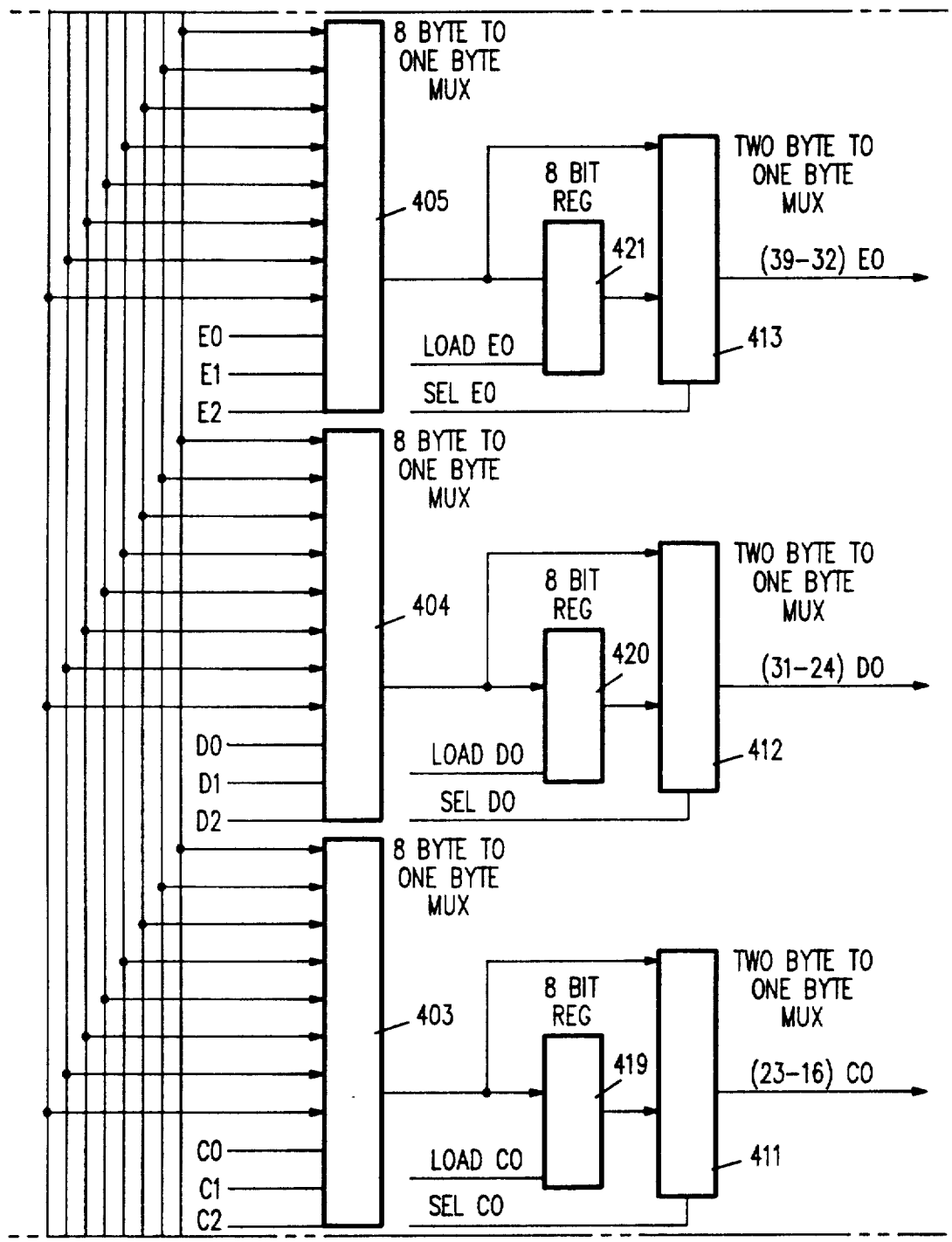
FIG. 4"

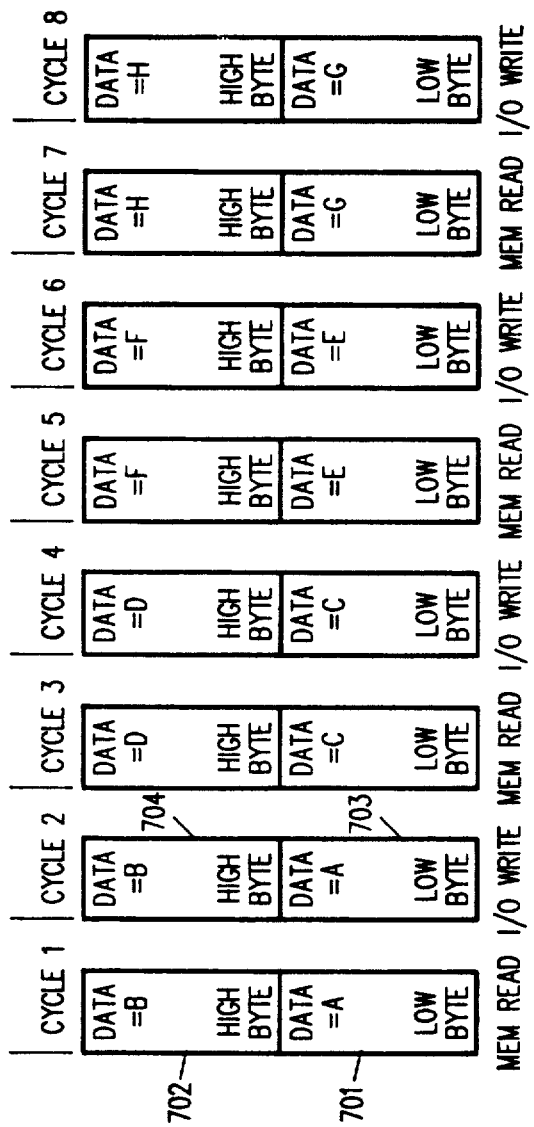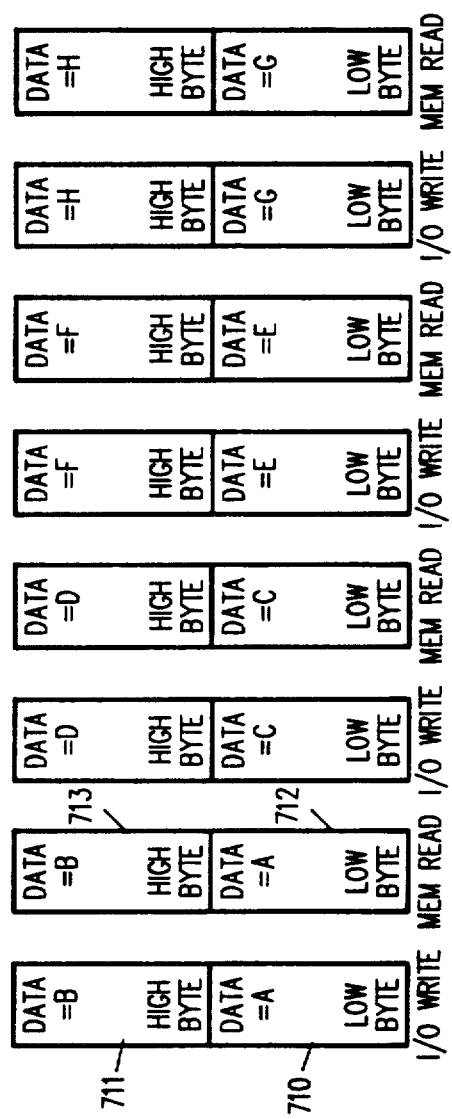

| DATA =9 |
| --- |
| ADDRESS 9 |

| DATA =8 |
| --- |
| ADDRESS 8 |

| DATA =7 |
| --- |
| ADDRESS 7 |

| DATA =6 |
| --- |
| ADDRESS 6 |

| DATA =5 |
| --- |
| ADDRESS 5 |

| DATA =4 |
| --- |
| ADDRESS 4 |

| DATA =3 |
| --- |
| ADDRESS 3 |

| DATA =2 |
| --- |
| ADDRESS 2 |

| DATA =1 |
| --- |
| ADDRESS 1 |

| DATA =0 |
| --- |
| ADDRESS 0 |

| DATA =F |
| --- |
| ADDRESS F |

FIG. 9A

16 BIT EVEN DECREMENT TRANSFER FROM MEMORY ADDRESS 6

16 BIT ODD DECREMENT TRANSFER FROM MEMORY ADDRESS 7

16 BIT ODD DECREMENT TRANSFER FROM MEMORY ADDRESS 7

16 BIT ODD DECREMENT TRANSFER FROM MEMORY ADDRESS 7

16 BIT ODD DECREMENT TRANSFER FROM MEMORY ADDRESS 7

16 BIT ODD DECREMENT TRANSFER FROM MEMORY ADDRESS 7

CONTROLLER FOR DIRECT MEMORY ACCESS

BACKGROUND OF THE INVENTION

This invention relates to sub-systems in computers for transferring data from one memory location to another, or from or to a memory location to or from an input-/output (I/O) device. In particular, the present invention relates to direct memory access (DMA) subsystems having data word widths of 2 or more bytes of data, each byte comprising 8 bits, in which the data may be manipulated and acted upon during the transfer.

In the past, computer systems have been designed to transfer data to the central processing unit (CPU) as quickly as possible so that the CPU could perform all of the operations necessary to achieve the desired results, including large scale iterative scientific computations, on-line business transactions processing, graphics interfaces, accounting programs, and a myriad of other data manipulation intensive operations. DMA became one of the leading methods for providing faster data transfers, particularly in bus-oriented computer system architectures. Even so, DMA subsystems take finite time periods, usually referred to as "bus cycles", or simply "cycles", to complete a data transfer operation. While cycle times have become shorter as the speed of semiconductor device technology becomes faster, the fact remains that no operations on the data could be performed until the transfers were complete.

In a related consideration, early computers were configured to operate on data word widths of 8 bits. As more complex functions were computerized, 8-bit bytes quickly limited the speed of computations and therefore, the throughput of data operations. Thus, wider word widths of 16, 32, 64 bits, and more, arranged into 8-bit wide bytes, were introduced.

Wider word widths are generally encountered in large scale, main frame systems, but may also be found in process control systems and the like which are driven by intermediate size computers also known as mini-computers. In addition to the general advancement of the level of competence of the individual user, much of the present day commercial and industrial business transactions are being implemented on personal computers (P/C) or P/C-based systems. Since it has become desirable to perform complex functions on P/C-based systems, such systems are being configured to operate on word widths wider than 8 bits to efficiently perform such complex operations. While the vast majority of installed P/C's are limited to 8-bit data word widths, microprocessors becoming commonly available for use in designing the next generation of P/C's have data widths of 16 and 32 bits. Thus, since peripheral devices and memory subsystems to which such microprocessors must interface can have data widths of 8, 16 or 32 bits, DMA subsystems must be compatible with such data widths to anticipate advances in software products and growth in the technology generally.

In the prior art, memory in an 8-bit data word system is directly addressed from the address bus. The memory is organized into 8-bit words, and each address signal decoded from the address bus points to a different and unique word (in this case, also equal to a byte) in the memory. In a system designed for 16-bit data words, the memory is organized into 16-bit words. As long as the DMA subsystem is only required to transfer data from a 16-bit memory or I/O device to or from a 16-bit I/O device or memory, each transfer comprises a word and the data is written or read to or from even numbered addresses. In the prior art, there are systems that provide both 8-bit and 16-bit memory-to-memory and memory-to-I/O device accesses.

If compatibility with 8-bit word I/O devices is desired, some provision for directing flow of data to and from the memory word locations is required. Therefore, typically, 16-bit memory words are further organized into two 8-bit bytes of data. Bits 0-7 and 8-15 are designated the low byte and high byte, respectively. Thus, in a 16-bit data word system, each word comprises two 8-bit bytes.

The method for directing the data to and from the individual bytes locations requires additional address signals called byte enables. In a 16-bit word system, the first address line which addresses the first low byte, i.e. the A0 address line, is replaced with two byte enable lines called "BE0N" and "BE1N". When the BE0N signal line is active, the lower byte of the data word is transferred; when the BE1N signal is active, the upper byte of the data word is transferred. When both BE0N and BE1N lines are active at the same time, both bytes, i.e. the complete word, is transferred at the same time.

Similarly, in a 32-bit word system having a 32-bit DMA subsystem, each word is organized into four, 8-bit bytes. In such a system, both address lines A0 and A1 are replaced with four byte enable lines, BE0N and BE1N, BE2N and BE3N, respectively. Likewise, in a 64-bit system with a 64-bit DMA subsystem, each data word is organized into eight, 8-bit bytes per word and address lines A0, A1 and A2, are replaced with eight byte enables BE0N through BE7N. In all cases, the byte enable lines are said to "point" to the bytes of the word that are to be transferred.

In prior art DMA subsystems, three bus cycles are required for a 16-bit data word transfer to and from an odd address in a P/C system compatible with 8-bit data word bytes. In such systems, the memory is organized into 16-bit words, (i.e. two 8-bit bytes) so that the word boundaries are on even addresses. Referring now to FIG. 1A, during cycle 1 for a 16-bit odd address location memory read cycle, the address points to an even memory location and an 8-bit read of the upper byte is performed in response to the byte one enable. The data read (byte A) is stored in a register associated with bits 7-0 comprising byte A. After the first memory read cycle, the memory address is incremented by two to the next even address, and the byte pointer is activated to point to the lower byte of data to be read (byte B). The lower byte of data is read and steered into another register during the second cycle. During the third cycle, the entire word, bits 15-8 and 7-0, i.e. bytes B and A, are assembled serially and driven onto the bus for transmission to the I/O device. Thus, it requires three cycles to transfer each word using this technique. If this technique is extrapolated for transferring words comprising more than two bytes, the number of cycles required would be (a+1)N, where a is the number of bytes per word and N is the number of words to be transferred. Thus, for a 4-byte word, 5 cycles/word would be required.

Referring to FIG. 1B, a 16-bit odd memory write operation is similar to the 16-bit odd memory read operation. Again, three bus cycles per transfer are required. In the first cycle, one word, i.e. two 8-bit bytes B and A, is read from the I/O device and stored in a latch. During cycle two, lower byte A in the latch is written to the upper byte memory location in response to byte enable BE1N. The memory address is incremented, BE1N is driven inactive and the upper byte in the latch is written to the lower byte memory location in response to byte enable signal BE0N.

It should be noted that, in the prior art, the memory address may be decremented in all 8-bit accesses and 16-bit accesses from an even address. However, for a 16-bit access from an odd address, the memory address may be incremented only.

As already noted, most computer systems, whether large scale main frame computers or modern day P/C's, transfer data to registers in or near the CPU or microprocessor, respectively, before manipulations including simple arithmetic operations, exclusive-OR and barrel shifting, are performed on it. However, the advent of very large scale integration (VLSI) semiconductor technology has provided the opportunity to implement previously impractical computing system architectures. See for example "VLSI: The Challenge to Innovate", VLSI systems Design, November, 1988 at p. 6. Thus, it is now practical to design systems which do many things faster or many more things in the same time, or both, than was previously possible. In particular, it is now possible to implement a practical DMA subsystem which transfers data faster, and which can manipulate data during the transfer, i.e. on-the-fly.

SUMMARY OF THE INVENTION

The DMA subsystem of the present invention includes a data manipulator which receives data during the read cycle of any DMA transfer. The data manipulator includes circuitry for rearranging the byte order of the data during transfer or optionally transferring the bytes of data in the order received. In addition, the data manipulator includes circuitry which provides the option of rearranging bit locations of the data within the bytes of data, or of performing logical or arithmetic operations on the data, during the transfer. Finally, the data manipulator includes circuitry for driving the data, altered or unaltered, back onto the data bus during the write cycle of the DMA transfer.

The data manipulator of the present invention provides several options for transferring the data while at the same time assuring compatibility with I/O devices of different data word sizes and providing with the opportunity for overall system performance improvements. Any byte of data presented to the input of the data manipulator can be manipulated while being transferred, regardless of the word-size of the data at either the origin or destination of the transfer.

Performing a barrel-shift operation on the data allows graphics-type data manipulations to take place during DMA transfers. Arithmetic and logical operations may also be performed on the data during DMA transfers to speed up operations such as stripping columns out of files. If used in conjunction with a memory-to-memory DMA transfer, file manipulation may take place independently of the system processor, again, during the transfer.

The DMA subsystem of the present invention is designed in one byte modular increments. The system may be expanded or reduced to any data desired word width.

In addition to providing the capability of manipulating data during a DMA transfer, the DMA subsystem of the present invention reduces the number of bus cycles required for a 16-bit data word transfer to or from an odd address. During an initial memory read cycle, the first 8 bits of data (i.e. low byte) is stored in a latch. During the second memory read cycle that first low byte is transferred into a register at the same time the next 16 bits (i.e. high byte of the first word and low byte of the second word) is loaded into the latch. During the write cycle, the second byte is steered from the latch to the upper byte location of the data bus and the first low byte is steered from the register to the lower byte location of the data bus. During subsequent cycles, the upper byte in the latch is loaded into the last-mentioned register when the latch is loaded with the next 16 bits of data. Thus, by adding a single register to the DMA subsystem and appropriately directing the flow of data, about 30% less bus cycle time is required to make DMA transfers of 16-bit data words from an odd address in the DMA subsystem of the present invention as compared with prior art DMA subsystems.

Other features and advantages of the present invention, in addition to those mentioned above, are described in the following detailed description of the preferred embodiment. The detailed description incorporates the accompanying drawings wherein similarly referenced characters refer to corresponding parts of the invention.

DESCRIPTION OF THE DRAWING

FIGS. 7A and 7B illustrate 16-bit transfers from even address locations as performed by the DMA subsystem of FIG. 2.

FIGS. 9A-9G illustrate conventions for 16-bit data word decrement transfers from an odd address in a computer system compatible with 8-bit data word width which incorporates the DMA subsystem of FIG. 2.

DESCRIPTION OF THE PREFERRED EMBODIMENT

Figure 1A:
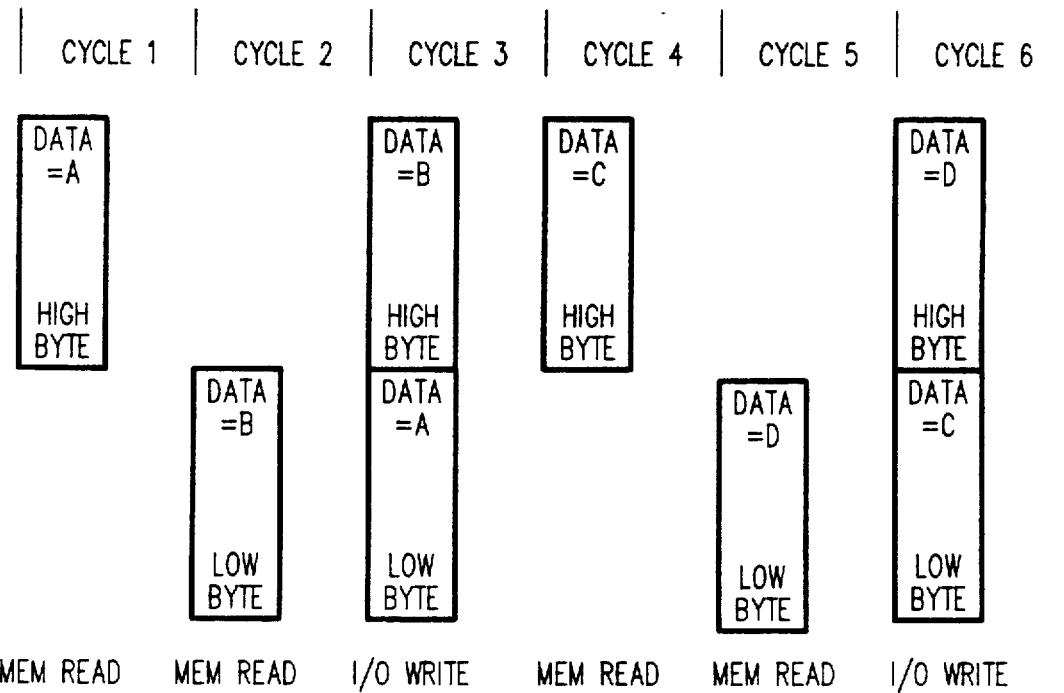
FIGS. 1A and 1B illustrate a 16-bit data word transfer to and from an odd address in a prior art computer system compatible with 8-bit data word width.
Figure 1B:
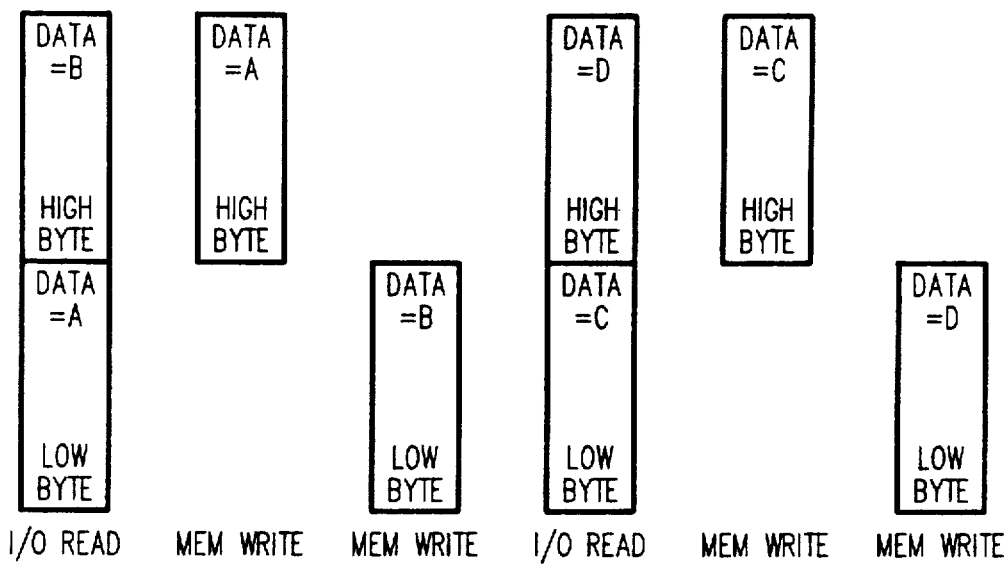
Figure 2:
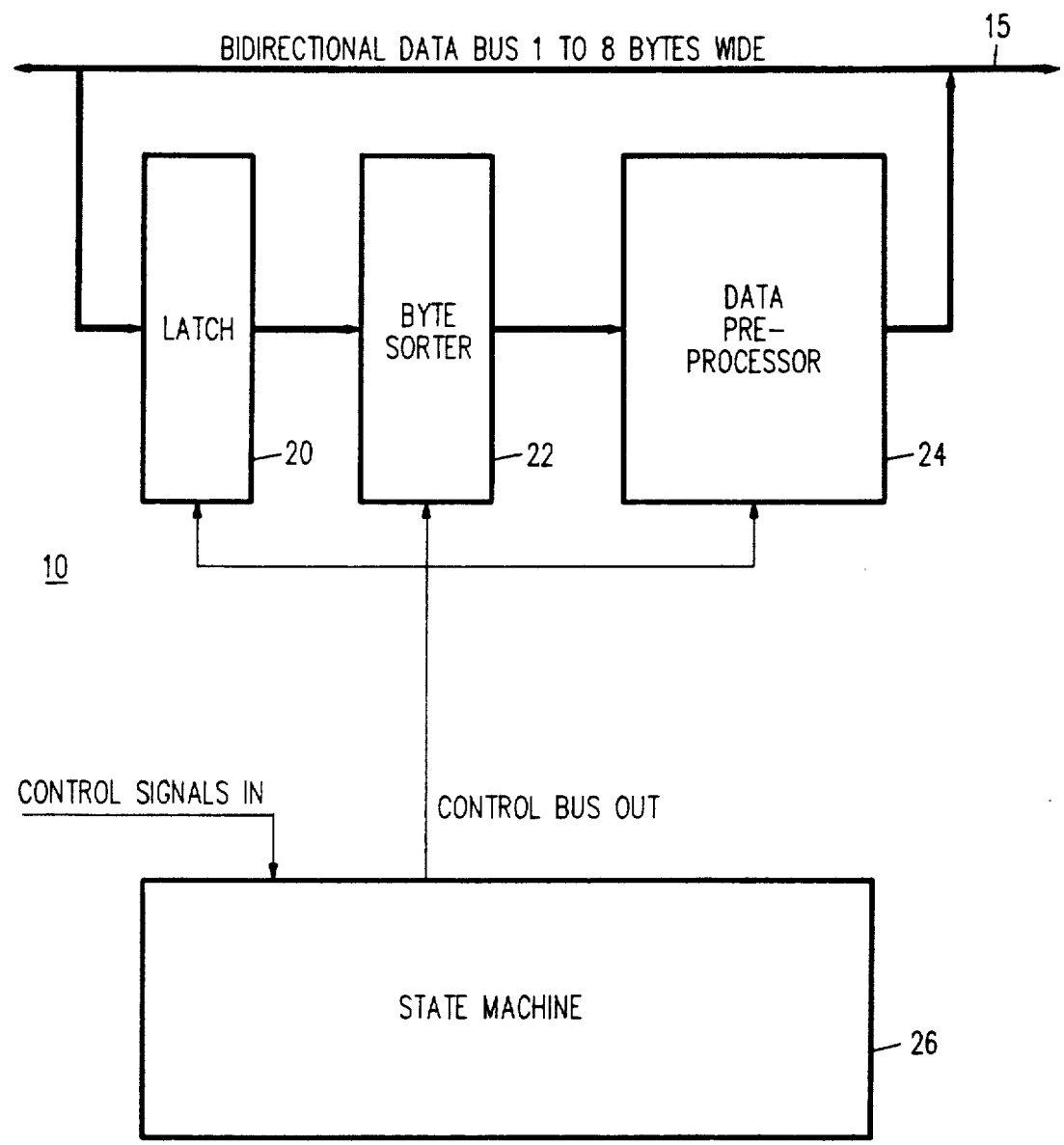
FIG. 2 is a block diagram of a data manipulator of a DMA controller constructed according to the principles of the present invention.

A DMA controller constructed according to the present invention includes data manipulator 10 as shown in FIG. 2 comprising latch 20, byte sorter 22 and data pre-processor 24, all of which being operationally controlled by state machine 26. With continuing reference to FIG. 2, the input of latch 20 is coupled to bi-directional data bus 15 for receiving data during a transfer operation. The output of latch 20 is coupled to the input of byte sorter 22. In similar fashion, the output of byte sorter 22 is coupled to the input of data pre-processor 24 for processing data received therefrom and for driving the data back onto bi-directional data bus 15.

Figure 3:
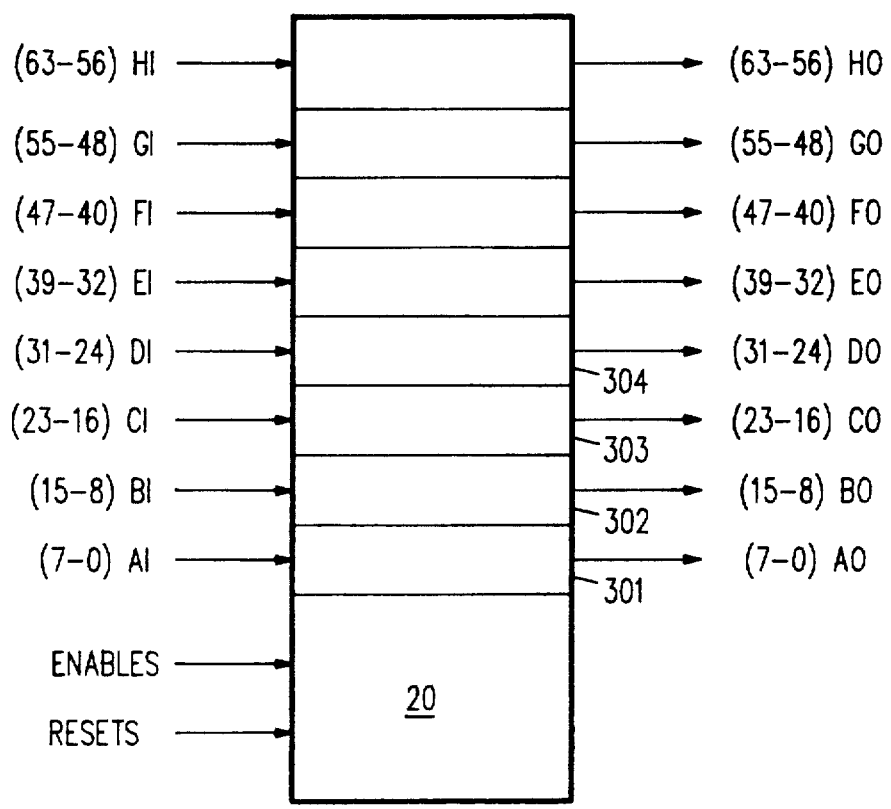
FIG. 3 is a block diagram of an input latch employed in the DMA subsystem of FIG. 2.

The size of latch 20 is determined by the maximum data width (in bits per word) of the computer system. As shown in FIG. 3 for a 64-bit computer system, latch 20 comprises standard transparent latches, such as type LACFNB manufactured by VLSI Technology, Inc., where one latch is used for each bit of data per word processed.

Figure 4:
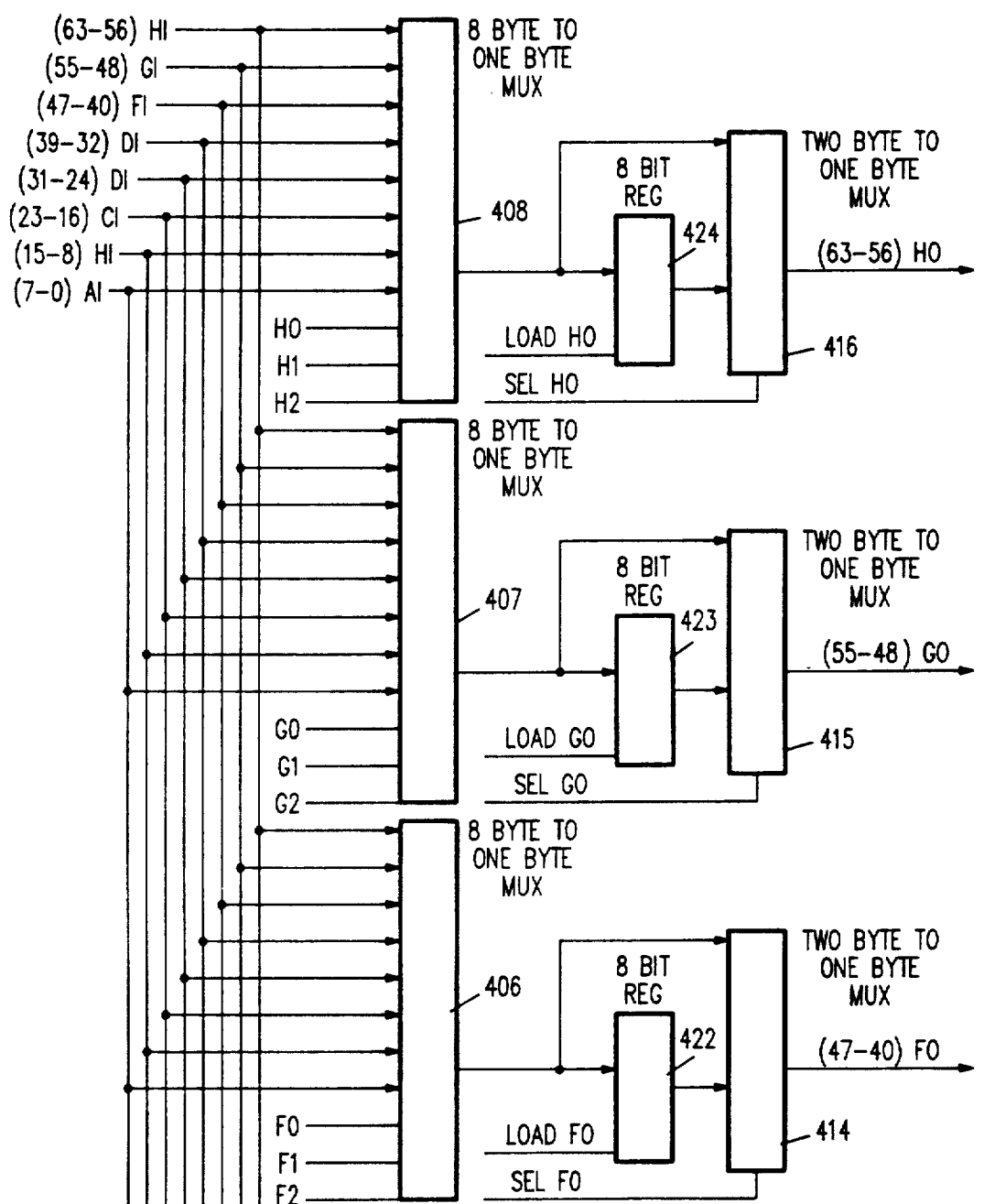
FIG. 4 shows the layout of FIGS. 4', 4'', 4''', which are a block diagram of a byte sorter employed in the DMA subsystem of FIG. 2.
Figure 4:
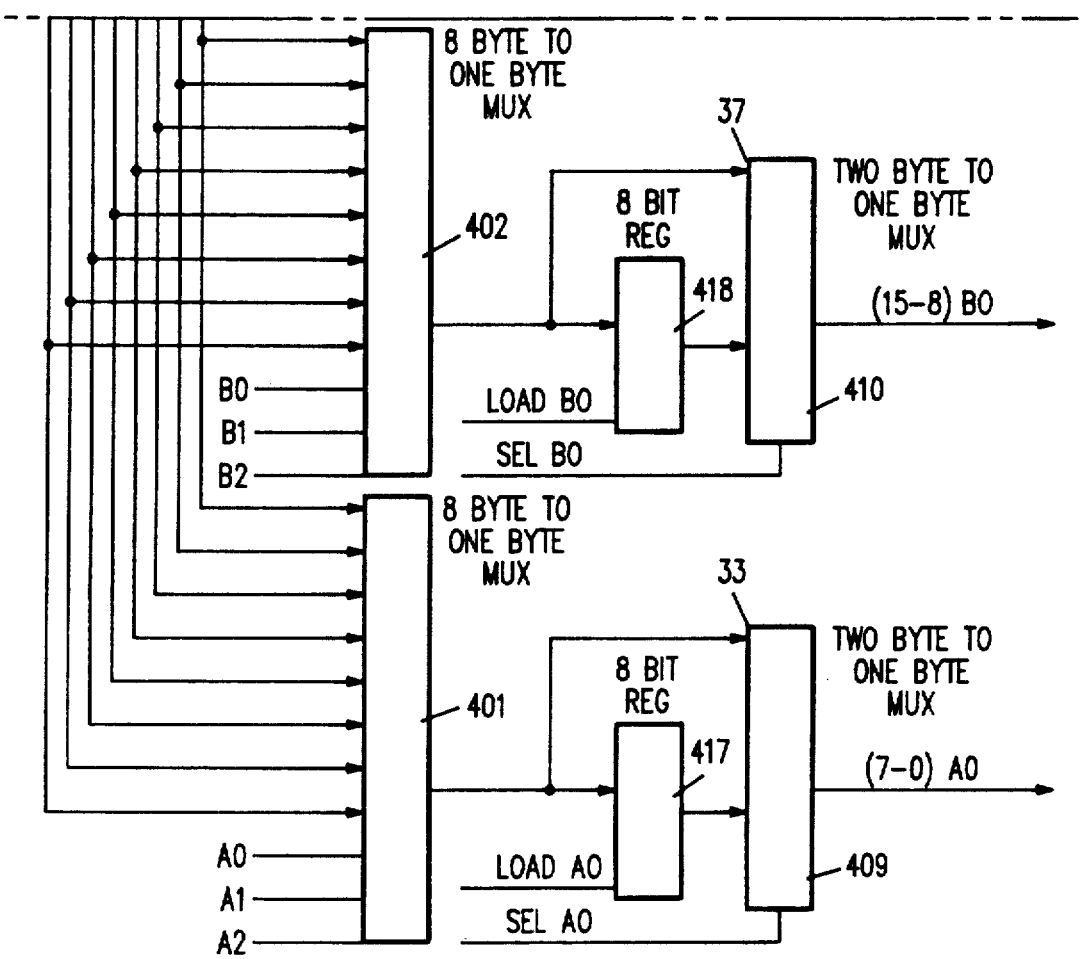
Figure 4:
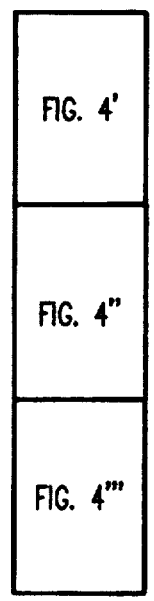

Referring now to FIG. 4, byte sorter 22 comprises multiplexers 401–408 coupled to multiplexers 409 to 416, respectively, and to 8-bit registers 417–424, respectively. Each multiplexer (MUX) 401–408 convert eight 8-bit bytes into one 8-bit byte; similarly, each MUX 409–416 convert two 8-bit bytes to one 8-bit byte, as shown. MUXes 401–408 and 409–416 are commonly constructed from components such as type MX21D1, manufactured by VLSI Technology, Inc. Registers 417–424 are commonly constructed from components such as type DFCTNB Flip flop, also manufactured by VLSI Technology, Inc.

For simplicity in illustrating the principles of the present invention, a 16-bit computer system, i.e. two 8-bit bytes, utilizes only the bottom two sections of the logic of byte sorter 22 for performing transfer operations.

Figure 6A:
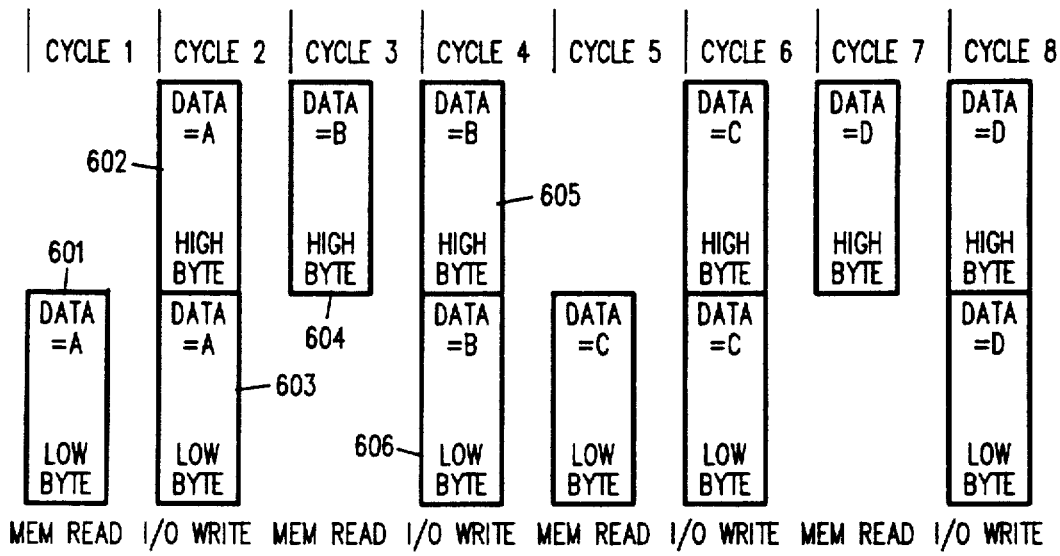
FIG. 6A illustrates an 8-bit memory read transfer as performed by the DMA subsystem of FIG. 2.

Referring now to FIG. 6A with continuing reference to FIG. 4, in cycle 1 of an 8-bit memory read transfer, byte A is read from an 8-bit memory location designated 601, having an even word address value, i.e., BE0N active, BE1N inactive, and written into byte location designated 301 of latch 20. After the data has been read, the memory address counter (not shown) is incremented by one so that it points to the next even word memory address but with BE0N inactive and BE1N active in preparation for executing the next memory read operation. During cycle 2, byte A is directed to both byte locations designated 602 and 603 of the 16-bit data bus in response to control signals A0, A1 and A2 at MUX 401 and control signals B0, B1 and B2 at MUX 402 and control signals SEL A0 and SEL B0 at MUXes 409 and 410, respectively, from state machine 26. Thus, data bits 7–0 coming into byte sorter 22 on input AI are steered through MUXes 401, 402, 409 and 410, respectively, for presentation at both outputs AO (bits 7–0) and BO (bits 15–8). Since, in the case of 8-bit memory transfers, there is no need to store data in registers 417 and 418, respectively, the data is passed directly to data bus 15.

DMA subsystem 10 is controlled by state machine 26 so that addresses are driven onto the address bus while also generating byte pointers to steer the data to the proper destination location. Thus, for example, during the second cycle of the 8-bit transfer, a byte zero enable signal, namely BE0N, is also generated as part of the address. BE0N indicates to the I/O device that it should write only the data that is designated byte zero, i.e. the lower 8 bits of the data bus, since the data is being directed to both the lower and upper byte of the data bus simultaneously.

During cycle 3, another memory read operation is executed. The data is read from the high byte memory location designated 604, having an even word address with BE0N inactive and BE1N active, and written into low byte location designated 302 of latch 20. During the fourth cycle this high byte data is directed to both byte locations 605 and 606 of the 16-bit data bus, and the address and byte pointers direct the data to the appropriate I/O device. Data continues to be transferred in the same manner during subsequent cycles as shown until the transfer operation is complete.

Figure 6B:
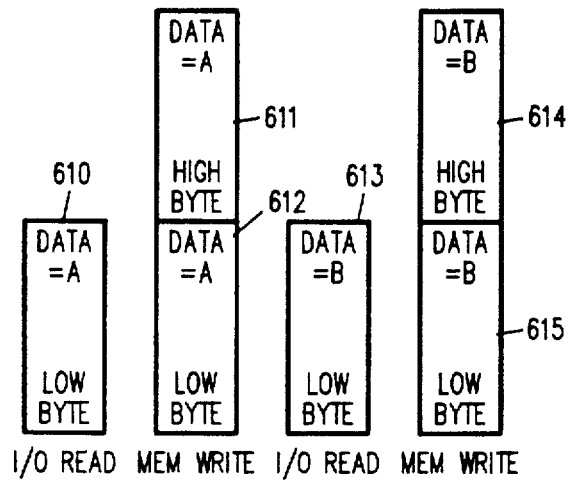
FIGS. 6B and 6C illustrate alternative 8-bit memory write transfers as performed by the DMA subsystem of FIG. 2.

Referring to FIG. 6B with continuing reference to FIG. 4, in cycle 1 of an 8-bit memory write transfer, one byte is read from an 8-bit I/O location designated 610 having an even address value and written into byte location designated 301 of latch 20. During cycle 2, byte A is directed to both byte locations designated 611 and 612 of the 16-bit data bus in response to control signals A0, A1 and A2 at MUX 401 and control signals B0, B1 and B2 at MUX 402 and control signals SEL AO at MUX 409 and SEL BO at MUX 410 from state machine 26. Thus, data bits 7–0 coming into byte sorter 22 on input AI are steered through MUXes 401, 402, 409 and 410, respectively, for presentation at both outputs AO (bits 7–0) and BO (bits 15–8). As before for 8-bit memory transfers, there is no need to store data in registers 417 and 418, respectively, and the data is passed directly to data bus 15.

DMA subsystem 10 is controlled by state machine 26 so that addresses are driven onto the address bus while also generating byte pointers to steer the data to the proper destination location. Thus, during the second cycle of the 8-bit transfer, a byte zero enable signal, namely BE0N, is also generated as part of the address. BE0N indicates to the memory that it should write only the data that is designated byte zero, i.e. the lower 8 bits of the data bus, since the data is being directed to both the lower and upper byte of the data bus simultaneously.

During cycle 3, another I/O read operation is executed. The data is read from the low byte I/O location designated 613, having an even word address with BE0N active and BE1N inactive, and written into low byte location designated 301 of latch 20. During the fourth cycle this low byte data is directed to both byte locations 614 and 615 of the 16-bit data bus, and the address and byte enables BE0N and BE1N direct the data to memory location designated 614. Data continues to be transferred in the same manner during subsequent cycles as shown until the transfer operation is complete.

Figure 6C:
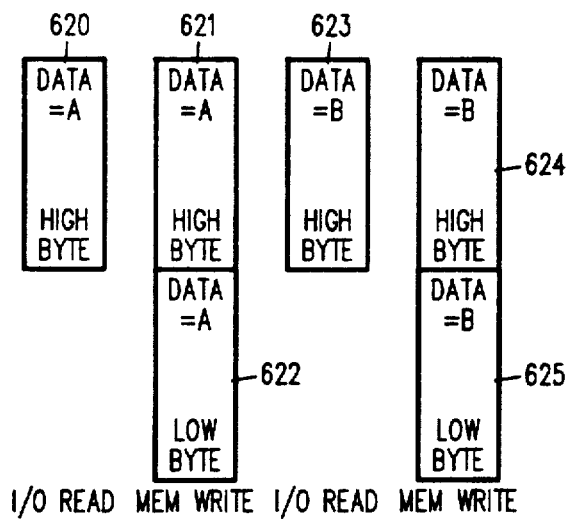

As shown in FIG. 6C with continuing reference to FIG. 4, in cycle 1 of an 8-bit memory write transfer, one byte is read from an 8-bit I/O location designated 620, having an even word address value with BE0N inactive and BE1N active, and written into byte location designated 302 of latch 20. During cycle 2, byte A is directed to both byte locations designated 621 and 622 of the 16-bit data bus in response to control signals A0, A1 and A2 at MUX 401 and control signals B0, B1 and B2 at MUX 402 and control signal SEL AO at MUX 409 and SEL BO at MUX 410 from state machine 26. Thus, data bits 7–0 coming into byte sorter 22 on input BI are steered through MUXes 401, 402, 409 and 410, respectively, for presentation at both outputs AO (bits 7–0) and BO (bits 15–8). Again, since in the case of 8-bit memory transfers, there is no need to store data in registers 417 and 418, respectively, the data is passed directly to data bus 15.

DMA subsystem 10 is controlled by state machine 26 so that addresses are driven onto the address bus while also generating byte pointers to steer the data to the proper destination location. Thus, during the second cycle of the 8-bit transfer, a byte one enable signal, namely BE0N, is also generated as part of the address.

BE0N indicates to the memory that it should write only the data that is designated byte 622, i.e. the lower 8 bytes of the data bus, since the data is being directed to both the lower and upper byte of the data bus simultaneously.

During cycle 3, another I/O read operation is executed. The data is read from byte I/O location designated 623, having even word address and BE0N inactive and BE1N active, and written into byte location designated 302 latch 20. During the fourth cycle this high byte data (hex value B) is directed to both byte locations 624 and 625 of the 16-bit data bus, and the address and byte pointers, i.e. BE0N inactive, BE1N active, direct the data to the appropriate memory location designated 624. Data continues to be transferred in the same manner during subsequent cycles as shown until the transfer operation is complete.

A 16-bit memory read operation, as shown in FIG. 7A, from an even address, i.e. both byte enables BE0N and BE1N active, is straightforward. During cycle 1 of such an operation, one word (two 8-bit bytes) is read from an even memory location designated 701 and 702, and written into the lower two byte locations 301 and 302 of latch 20. The memory address counter (not shown) is incremented by two in preparation for the next memory read operation. State machine 26 controls MUXes 401 and 402 so that the bytes are passed straight through byte sorter 22 and directed onto 16-bit data bus 15 for transmission to byte locations 703 and 704 at the appropriate I/O device during the second cycle of the DMA transfer operation. Data transfers continue in the same way during subsequent cycles as shown until the transfer operation is complete. Of course, the data may be subjected to operations performed by data preprocessor during the transfer, if desired, as described elsewhere in this specification.

Referring now to FIG. 7B, a 16-bit memory write operation to an even address is similar to the corresponding 16-bit memory read operation. During cycle 1 of such a transfer, one word (two 8-bit bytes) is read from the I/O device and written into the lower two byte locations designated 301 and 302 of latch 20. During cycle 2, the data is passed directly through byte sorter 22, then directed onto data bus 15 for transmission to appropriate memory locations designated 712 and 713. Thereafter, the memory address counter (again, not shown) is incremented to the next address in preparation for executing the next transfer operation.

Figure 8A:
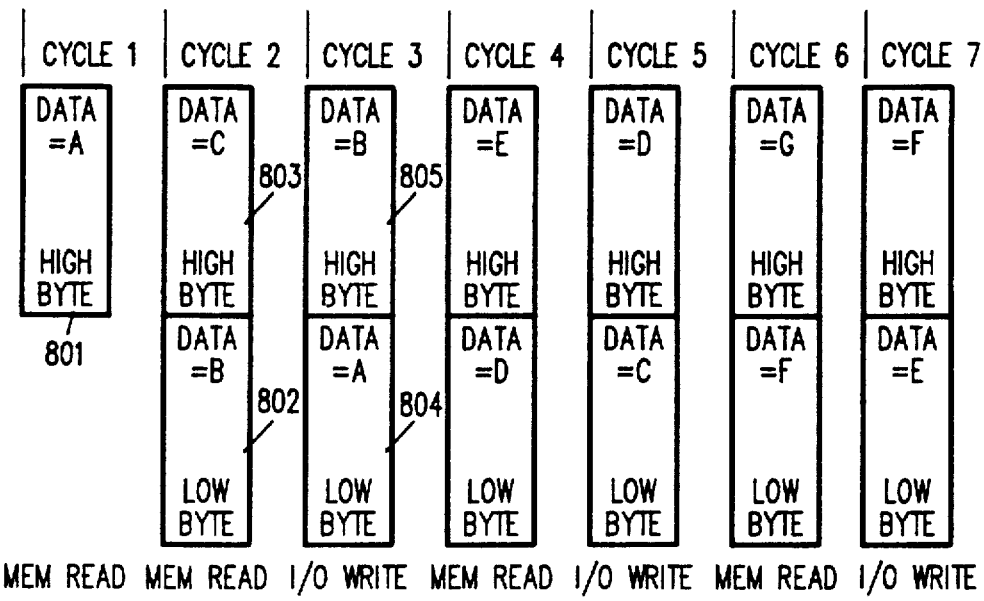
FIGS. 8A and 8B illustrate a 16-bit data word transfer to and from an odd address in a computer system compatible with 8-bit data word width which incorporates the DMA subsystem of FIG. 2.

With reference now to FIG. 8A, the first byte of a 16-bit odd memory read operation is read in the same way as described for the corresponding prior art operation. Thus, at the end of the first cycle, the first byte is stored in byte location designated 302 in latch 20, corresponding to byte location designated 801. The memory address pointer is incremented to the next even word address. However, during the second cycle, byte A, stored in location designated 302 of latch 20, is transferred through MUX 401 into register 417. Since the memory address is now at an even boundary, a 16-bit memory read operation is executed whereby both bytes B and C are written to locations designated 301 and 302 in latch 20 corresponding to byte locations 802 and 803, respectively. During cycle 3, byte B is directed to byte location designated 805 via MUXes 402 and 410. At the same time, byte A, which is stored in register 417, is directed to byte location 804 via MUX 409. The address register is incremented to point to the next even memory address in preparation for the next memory read operation. At the beginning of cycle 4, data byte C is transferred through MUX 401 into register 417. The next memory read cycle operation is also 16-bits wide, comprising byte D of word two and byte E of word three. The two data bytes are cross-transferred and stored during the write cycle of the transfer, as before.

In the present invention, only the first memory read cycle is 8 bits (1 byte) wide. After that initial cycle, read operations are always 16 bits wide, and the bytes are cross-transferred and stored to allow the I/O device to write them in the correct order. In this way, only one extra cycle is required at the beginning of the transfer, and every 16-bit word thereafter is transferred using only two cycles to complete the transfer operation.

Figure 8B:
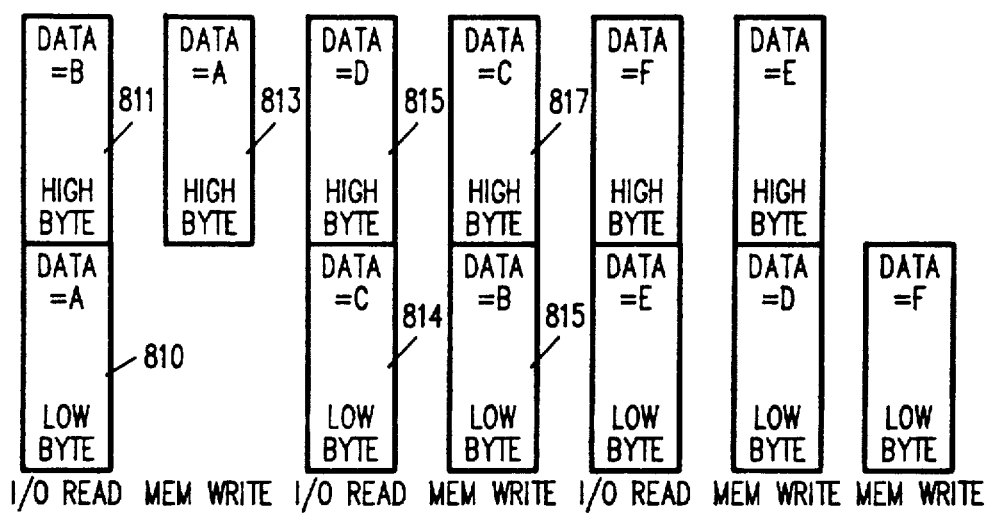

In the 16-bit odd address memory write operation depicted in FIG. 8B, three cycles are required for the last transfer of a burst of data, but only two cycles are required for all other transfer operations. In cycle 1, one word (two 8-bit bytes A and B) is read from the I/O device and stored at locations designated 301 and 302 in latch 20 from byte locations designated 810 and 811. During cycle 2, byte A in latch 20 location designated 301 is directed to the odd byte location corresponding to B0 (bits 15-8) at location designated 813 via MUXes 402 and 410. During cycle 3, the memory address counter is incremented so that it points to an even or complete word boundary. In addition, during this cycle, byte B in latch byte location 302 is stored in register 417. Since the memory address is now at an even boundary, subsequent transfers will be complete 16-bit word transfers with the individual bytes sorted and steered so that they will be written in the right order in their respective memory's locations. Also during cycle 3, the next word comprising byte C and byte D of word two is read from the I/O device and stored in latch 20 at locations designated 301 and 302, respectively During cycle 4, byte C in latch 20 at location designated 301 is directed to byte location 817, corresponding to B0 (bits 15-8). At the same time, the contents of register 417 are directed to byte location 816 corresponding to the memory location A0 (bits 7-0). This sequence continues until the last full word has been written. During the memory write operation for the last full word, the memory address counter is again incremented to point to the next even address and one last cycle is executed with enable signal BE0N active and enable signal BE1N inactive. Therefore, during the last cycle, only the last byte of data, which is contained in register 417 is directed into the data bus and the data transfer is complete.

In a P/C system compatible with 8-bit data words according to the present invention, every transfer of multi-byte words to or from a memory location requires two bus cycles to complete—one cycle for the read operation and one for the write operation. If the transfer is to or from an odd memory address location, only one additional cycle per transfer is required, irrespective of the number of words or the number of bytes comprising the words of data to be transferred. Thus, such transfers require $2N+1$ cycles, where N is the number of data words to be transferred. Therefore, for a 100 word transfer using the technique of the present invention, 201 cycles are required, whereas in prior art DMA subsystems, 3N cycles, or 300 cycles, are required for the same data transfer operation.

Furthermore, the performance advantage of the present invention becomes greater as the amount of data to be transferred or the size of the memory increases. By transferring whole, multiple-byte words as soon as an even memory address boundary is reached (at the beginning of the second cycle), the speed of such transfers is substantially increased by reducing the number of cycles required, while maintaining compatibility with devices designed for computers with different data word widths and providing capability to manipulate the data on-the-fly.

As noted elsewhere in this specification, the byte address pointer may be decremented to next byte to be transferred, even from an odd address, for a 16-bit word transfer. Since no convention exists in the prior art for determining which byte segments of a 16-bit word are to be transferred from a given address to which the byte pointer has been decremented, the present invention anticipates several different conventions.

Figure 9B:
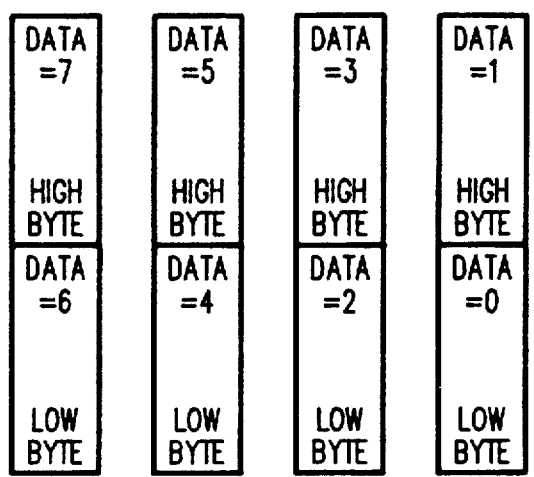
Figure 9C:
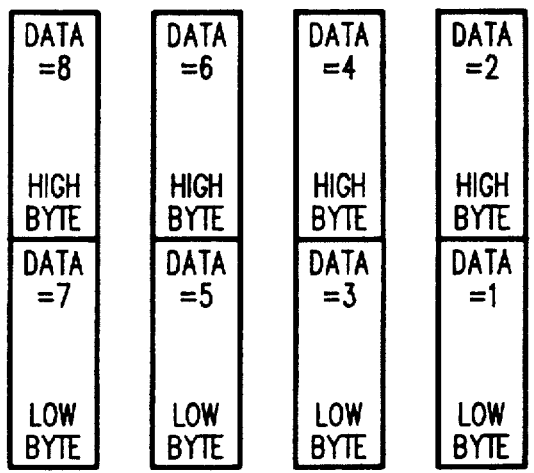
Figure 9D:
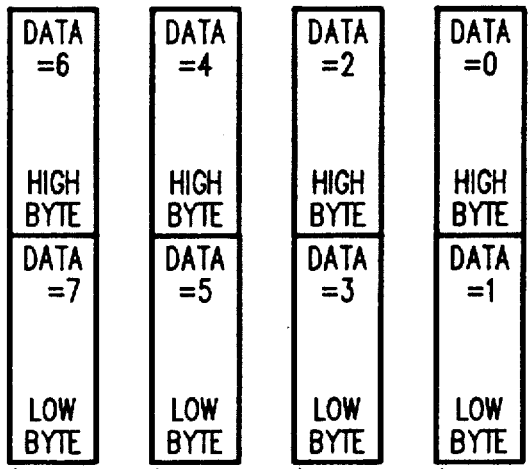
Figure 9E:
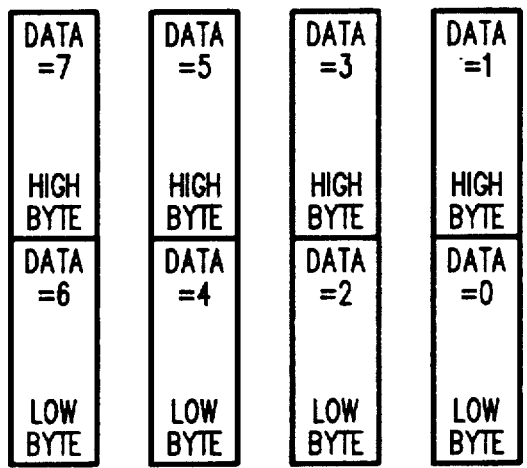
Figure 9F:
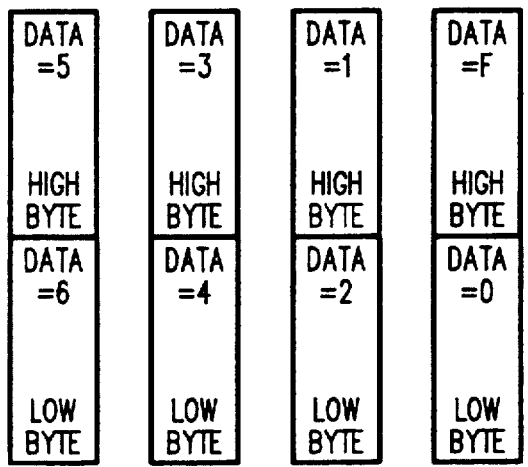
Figure 9G:
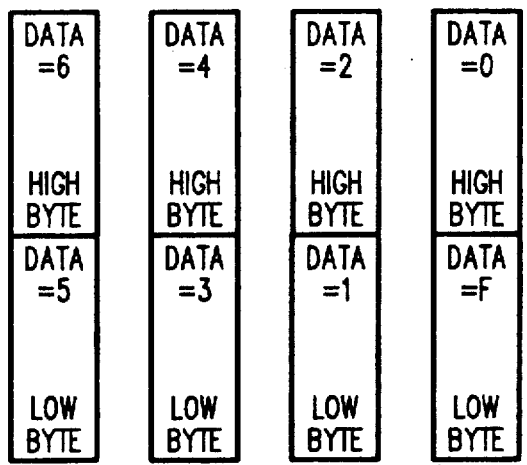

FIG. 9A shows the physical layout of a memory system for purposes of reference to the alternative conventions of FIGS. 9B–9G. Thus, for example, 8-bit data byte 5 is stored at physical location, address 5. In FIG. 9B, transfer from even memory address 6 in decrement mode is illustrated according to the generally accepted industry convention.

FIGS. 9C–9G illustrate several conventions for transfer of data from odd memory address 7 in decrement mode according to which the controller of the present invention can transfer data. Thus, for example, the first 16-bit word transferred in FIG. 9D comprises bytes 6 and 7 in high byte-to-low byte order, whereas the first word transferred in FIG. 9E comprises the same bytes but in reverse order.

In all conventions proposed, data transfers are implemented in analogous manner to that described for 16-bit word transfers from odd addresses in which the byte address pointer is incremented. Thus, only the desired convention is required to determine the order of control of byte enable signals, BE0N, BE1N . . . BEnN for implementing data transfers in decrement mode.

Figure 5:
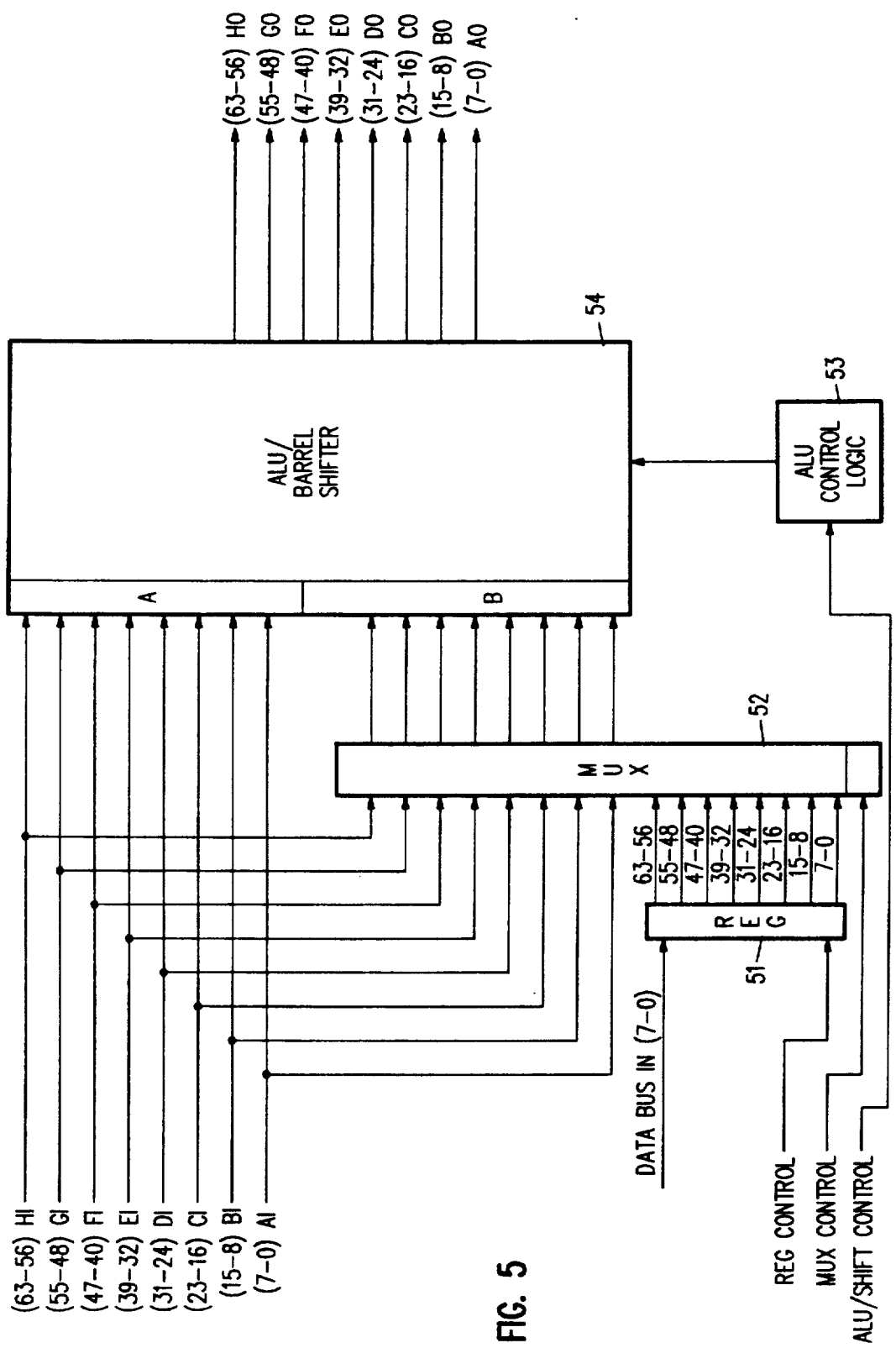
FIG. 5 is an ALU/barrel shifter employed in the DMA subsystem of FIG. 2.

Data manipulation includes the sorting of data word bytes during a transfer as described in connection with byte sorter 22 as shown in FIG. 4. However, by forming a data path for DMA transfer operations which includes data pre-processor 24, manipulation of data can be expanded to include operations such as barrel shifting, exclusive OR, and other arithmetic and logical operations which are otherwise typically performed by the system processor. Data pre-processor 24 includes register 51, MUX 52, ALU control logic 53 and ALU/barrel shifter module 54. ALU/barrel shifter module 54, as shown in FIG. 5, is similar to the continuation of types VDP3ALU001 and VDP3BSH001, produced by VLSI Technology, Inc., and may be designed in accordance with design rules given in "VDP 10 Datapath Element Library", published by VLSI Technology, Inc.

The design of the data manipulator of the present invention is modular, in single 8-bit byte increments. The word width can be expanded or contracted to any desired data word width. In addition, the duration of time for data manipulation between read and write operations of a DMA transfer also may be expanded to provide for any number and types of manipulations of the data being transferred consistent with the computer system operating parameters.

A detailed specification of a DMA controller constructed according to the preferred embodiment of the present invention is given in Exhibit A, available in the patented file, hereto, which is incorporated by reference herein. While preferred forms and arrangements have been shown illustrating the invention, it is to be understood that various changes in detail and arrangement may be made without departing from the spirit and scope of this disclosure or the claimed invention.

I claim:

1. In a computer system including memory means having a plurality of storage locations for storing information and a bidirectional bus having input/output devices coupled thereto, a direct memory access apparatus comprising:

first register means coupled to a bidirectional bus for receiving blocks of data transferred from storage locations in a memory means or from storage locations in input/output devices, said data blocks having a predetermined length;

data sorter means coupled to said first register means and to said bidirectional bus responsive to control signals for sorting bytes of data received from said first register means and coupling said data bytes to said bidirectional bus for transfer to a designated destination, said data bytes coupled to said bidirectional bus in a predetermined sequence;

control means coupled to said data sorter means and to a system processor responsive to processor control signals for generating said data sorter means control signals;

said data sorter means further comprising:

a plurality of first multiplexer means coupled to said first register means, each of said first multiplexer means having a plurality of input lines for receiving said data blocks from said first register, each said data block comprising at least one byte of data, each said first multiplexer being responsive to a first control signal for outputting a selected one of said data bytes of said data block;

each of said plurality of first multiplexer means having a second register means coupled to an output line thereof, each said second register means responsive to a load signal for receiving and storing said data byte output from each said first multiplexer means coupled thereto; and each of said plurality of first multiplexer means having a second multiplexer means coupled to said output line and to said second register means, each said second multiplexer means responsive to a second control signal for outputting a selected data byte to said bidirectional bus, said selected data byte being either the contents of said second register or the current data byte output by said first multiplexer means.

2. A direct memory access apparatus as in claim 1 wherein said first register means comprises a plurality of latch means, each of said latch means coupled to one of said plurality of first multiplexer means input lines, each of said latch means coupled to said bidirectional bus for receiving one byte of data of said data block transferred from said storage locations during a bus cycle, each said latch means transferring one byte of data to either said bidirectional bus via a selected first multiplexer means and its associated second multiplexer means or to a selected second register means via the associated first multiplexer means during a bus cycle.

3. A direct memory access apparatus as in claim 2 wherein each of said latch means comprises an eight-bit latch.

4. A direct memory access apparatus as in claim 2 wherein:

at least one first byte of data having an odd address and forming a partial block of data is read from a first storage location and transferred via said bidirectional bus to a corresponding ones of said latch means during a first bus cycle;

a full first block of data is read from a second storage location and transferred to said plurality of latch means, each byte of data of said full block of data stored in a corresponding latch means and said first bytes of data read during said first bus cycle being simultaneously transferred to selected ones of said second register means during a second next subsequent bus cycle; and a full second block of data is written to a desired destination device via said bidirectional bus, said full block of data comprising said first bytes of data transferred from said second register means and those bytes of data of said first block of data not having an address corresponding to said odd addresses of said first bytes of data, those bytes of data of said first block of data having an address corresponding to said odd addresses of said first bytes of data being simultaneously transferred to said selected ones of said second registers during a third subsequent bus cycles, said second block of data bytes arranged in a predetermined order.

5. A direct memory access means as in claim 1 further comprising pre-processor means coupled between the outputs of said plurality of second multiplexer means and said bidirectional bus responsive to control signals from said control means for performing arithmetic and logic operations on said data bytes output by said plurality of second multiplexer means.

* * * * *